Figure 1:
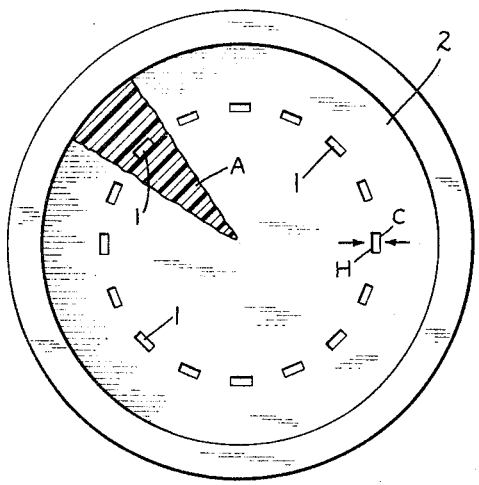

INVENTOR
JULIUS SHRENSEL
BY
*Robert A. Harman*
ATTORNEY

3,273,200
DISTRIBUTOR PLATE
Julius Shrensel, Richmond, Va., assignor to Allied Chemical Corporation, New York, N.Y., a corporation of New York
Filed Apr. 15, 1964, Ser. No. 359,869
2 Claims. (Cl. 18—8)

This invention relates to distributor plate for use in fabricating plastic materials from the melt, in particular for use in melt spinning of filaments.

It has been recongnized in the art that filaments spun from molten synthetic linear polymers in the usual apparatus are not uniform in quality. It has been suggested that this lack of uniformity may arise because the outer portions of molten polymer passing through the filter pack and spinneret are colder and therefore more viscous than the polymer at the center. The result is a slower delivery of polymer through the outer spinneret holes as compared to those near the center; whence the outer filaments are more attenuated, are cooled more quickly, etc., resulting in physical differences in the filaments; and also chemical differences may be produced.

Molten linear polymers used for spinning are highly viscous, slow flowing substances. Except under inordinately high pressure differentials, their flow through passageways is streamline, rather than turbulent. Under these conditions heat transfer coefficients between the polymer and the walls of passageways through which the polymer flows are relatively low so that obtaining temperature uniformity during flow of these molten polymers through passageways by heat exchange is too slow a process to be fully effective at the high spinning speeds which are desirable.

In accordance with the present invention I provide a distributor plate above the spinneret, having passageways designed to produce contact between a stream of molten polymer from the outer portion of the filter pack with a stream from the inner portion, so that heat transfer is directly from molten polymer to molten polymer, via mixing of the streams.

My distributor is a plate provided with passageways, preferably straight vertical passageways, the walls of which describe a rotation of about 90° from the entrance end to the exit end of each passageway, all the rotations being in the same sense. Suitably the entrances to the passageways are arranged in a ring—i.e. spaced about a closed curve, such as a circle about the center of the top face of the plate. The ring is suitably of such diameter that the area outside the ring is approximately equal to the area inside the ring. Thus when the plate is cylindrical and the ring is a circle, the radius of the circle will be about 7/10 the radius of the top face of the plate.

Each of the passageways preferably has a straight longitudinal axis perpendicular to the faces of the distributor plate. Preferably the passageways are uniform and are of rectangular cross section with long dimension about 2 to 5 times the length of the short dimension. The walls of each such passageway twist lengthwise, so that any given point on the periphery of the entrance to a passageway describes essentially a helix which turns through 90° of arc as the passageway descends through the distributor. These rectangular passageways are preferably equi-spaced in cylindrical arrangement concentric with the center of the distributor plate. In these preferred distributors the long dimension of the rectangular entrances is set tanget to the circle in the top face, on which the entrances lie; and in the course of the 90° rotation of the walls as the passageways descend to the bottom or outlet face of the distributor, the long dimension of the rectangles is brought to a position along the radius of the circle on which the exits from the passageways lie.

Figure 2:
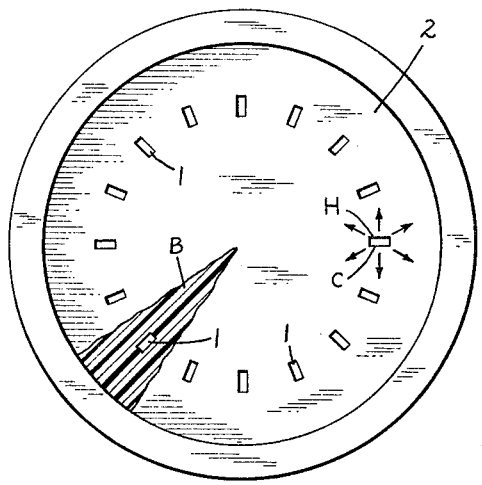
Figure 3:
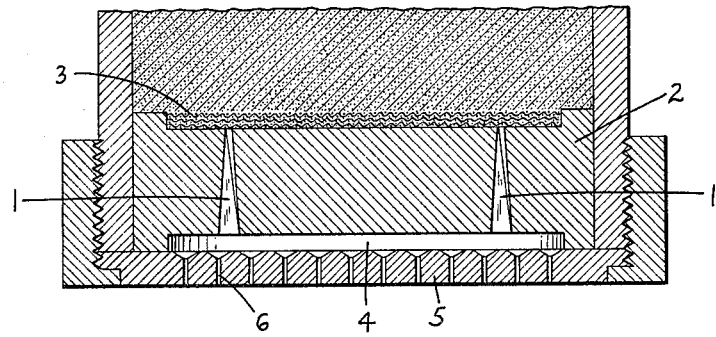
Figure 4:
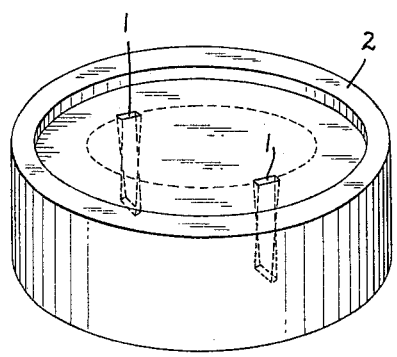

In the accompanying drawing:
FIG. 1 is a top view of my distributor plate, showing a section "A" of the polymer melt on the plate;
FIG. 2 is a bottom view of my distributor plate, showing a section "B" of the polymer melt below the plate;
FIG. 3 is a vertical cross section showing my distributor plate in relation to a conventional filter pack and spinneret used in melt spinning of synthetic organic polymers; and
FIG. 4 is a perspective view of my distributor plate wherein for clearness only two of the distributing passageways have been shown, the remainder being understood to lie equally spaced around the cylinder indicated by the dotted line in FIG. 4.

In the figures, 1 designates slots or passageways through the distributor plate in accordance with my invention; 2 designates the body of the distributor plate; 3 designates wire screens located on the top surface of the distributor plate to retain the sand of the conventional filter pack and to distribute the polymer melt over the top surface of the distributor plate; 4 designates a space below my distributor plate and above the spinneret into which the polymer melt flows from the distributor plate; 5 designates the spinneret as a whole, and 6 designates the spinneret orifices.

In FIG. 1, the area A, hatched to indicate plastic, represents a portion of the polymer melt distributed by screens 3 over the top surface of my distributor plate, in the vicinity of the entrance to one of the passageways in the distributor plate. (The passageways are shown empty for clearness.) Because of heat losses from the filter peack, the molten polymer lying outside the circle of passageways 1 on the upper surface of my distributor plate will be colder on the average than the molten polymer lying inside this circle on the top surface of the distributor plate. This situation is indicated in FIG. 1 by the letters C and H. The arrows in FIG. 1 indicate the general direction of flow of molten polymer into the passageways on the top surface of my distributor.

In FIG. 2, the hatched area B likewise represents a portion of the polymer melt, which in this case has passed through a passageway in my distributor plate and into the space 4 between the distributor plate and the spinneret. The passageways are again shown empty for clearness. The letters C and H in FIG. 2 indicate the hotter and colder portions of the polymer melt occupying the space 4 below the exit from one of the passageways of my distributor plate; and the arrows in FIG. 2 indicate the general direction of flow of the molten polymer, out of the passageways of my distributor plate and within the space 4 between the distributor plate and spinneret 5.

The operation of my distributor is as follows with reference to the accompanying drawings. Since the flow is streamline the polymer on the top face of my distributor, in the area outside the circle of entrances to the slots, flows predominantly radially inward and over the outer edges of rectangular slots 1 as indicated by the inward pointing arrow in FIG. 1. This flow of polymer goes down through the slots, occupying that half of each slot closest to that wall thereof generated by the outer edge as it describes its 90° helical twist down through the width of the distributor. The polymer in the area within the circle of entrances to the slots similarly flows predominantly radially outward as indicated by the outward pointing arrow of FIG. 1 and flows over the inner edge of the rectangular slot. This hotter polymer then occupies that half of the slot closest to the wall defined by the inner edge as it describes its 90° helical twist through the distributor.

Since the flow is streamline the polymer twists with the slot, with little mixing taking place, and emerges at the bottom of the slot along the edge of the same wall it contacted upon entering. The pattern of flow in the space 4 between the distributor and the spinneret is somewhat dependent on the location of the holes in the spinneret. The flow will be predominantly from each long edge of the rectangular outlets, and especially where there is a large number of spinneret holes uniformly distributed over the surface of the spinneret, the flow will approximate a wedge-shaped segment of polymer from each long edge of the outlets. This results in bringing the polymer from the inner portion of the filter pack and from the outer portion thereof into direct contact along the midplanes of the helical slots, along the radii on which the slots lie, and along the radii midway between the slots.

One of the wedge-shaped segments thus formed in the space 4 above the spinneret is indicated at B in FIG. 2, the direction of flow of hot and cold polymer being indicated in FIG. 2 by the arrows and the letters H and C respectively. Since the sense of rotation is the same in all passageways it will be appreciated that hot polymer from one passageway will contact cold polymer from the adjoining passageway all around the circle.

The contact of hot and cold polymer in the slots and in the space 4 tends to equilibrate the temperature differences between the two portions of polymer in the space 4 below the slots (see FIG. 3). The intimate contact of the successive hot and cold portions of polymer moreover permits some diffusion to take place between portions and thus tends to remove any differences in chemical composition which may have resulted, e.g. by variations in polymerization/depolymerization equilibrium, while portions of the polymer were at different temperatures.

*Example*

A spinning machine provided with a sand pack having the helical slot distributor above described and illustrated in the herein drawing was put into operation using a feed of natural color nylon chips. After it had reached equilibrium spinning conditions, a small amount of black chips was added to the feed. At the spinneret, which contained 136 capillaries arranged in five concentric rings, the following events were observed:

The first appearance of grey fiber was from the innermost ring of capillaries, indicating that the hottest portion of the black polymer which would flow fastest, tended to come through at the center. Immediately thereafter a radial pattern of alternate grey and natural color developed corresponding to the pie-shaped wedges above described and indicated at B in FIG. 2. The extrusion was stopped and the spinneret removed. The space between the spinneret and the distributor plate (space 4 of FIG. 3) contained a dark center area from which wedges of alternate dark and light polymer radiated, indicating the homogenizing effect of the distributor plate.

The passageways of my invention can take various forms and need not have a rectangular cross section nor a straight longitudinal axis, and their rotation need not be helical. An oval or square cross section would do. Even a circular section could be used, with the 90° turn achieved by carrying the walls of the slot in a path around a right circular cylinder to describe a rotation of 90° from the entrance to the exit end of the passage.

Obviously a distributor plate in accordance with my invention can include, together with passageways as above described, other kinds of passageways, e.g. straight through, slanting, etc. These and other variants and modifications are to be understood as within the scope of my invention.

I claim:

1. In melt spinning apparatus, a distributor plate with a plurality of passageways, and a multihole spinneret next downstream from said distributor plate; and in said distributor plate the walls of the passageways describe a rotation of about 90° from the entrance end to the exit end of each passageway, all the rotations being in the same sense; the longitudinal axis of each passageway is straight and perpendicular to the faces of the plate, the passageways are equi-spaced in cylindrical arrangement concentric with the center of the plate, and the passageways are uniform and are of rectangular cross section, with the long dimension of the rectangular entrances tangent to the circle in which the entrances lie at the top face of the distributor plate, and with the walls rotating to bring the long dimension of the rectangular exits to a position along the radius of the circle in which the exits lie at the bottom face of the distributor plate.

2. Distributor plate of claim 1 wherein the long dimension of the rectangular cross section of each passageway is from about 2 to about 5 times the length of the short dimension of the passageway and wherein the area of the top face of the distributor plate outside the circle of passageways is about equal to the area inside the circle.

References Cited by the Examiner

UNITED STATES PATENTS

| | | | |
|---|---|---|---|
| 2,332,955 | 10/1943 | Vautie | 18—12 X |
| 2,838,365 | 6/1958 | Jarrett | 18—8 |
| 3,070,841 | 1/1963 | Schornstheimer | 18—12 X |

WILLIAM J. STEPHENSON, *Primary Examiner.*